US010305320B2

(12) United States Patent
Tricarico et al.

(10) Patent No.: US 10,305,320 B2
(45) Date of Patent: May 28, 2019

(54) METHOD OF CONTROLLING AN UNINTERRUPTIBLE POWER SUPPLY SYSTEM TO OPTIMIZE COMPONENT LIFE

(71) Applicant: Chloride Srl, Castel Guelfo (IT)

(72) Inventors: Matteo Tricarico, Castel San Pietro Terme (IT); Enrico Guidotti, Castello d'Argile Bologna (IT); Pier Ugo Costa, Imola (IT); Andrea Pettenò, Arese (IT)

(73) Assignee: Vertiv S.R.L., Piove di Sacco (IT)

( * ) Notice: Subject to any disclaimer, the term of this patent is extended or adjusted under 35 U.S.C. 154(b) by 823 days.

(21) Appl. No.: 14/672,532

(22) Filed: Mar. 30, 2015

(65) Prior Publication Data

US 2016/0294211 A1 Oct. 6, 2016

(51) Int. Cl.
*H02J 7/00* (2006.01)
*H02J 9/00* (2006.01)
*H02J 9/06* (2006.01)

(52) U.S. Cl.
CPC ........... *H02J 9/061* (2013.01); *H02J 7/0068* (2013.01); *H02J 7/0077* (2013.01); *H02J 9/00* (2013.01)

(58) Field of Classification Search
CPC .. H02J 9/061; H02J 9/00; H02J 7/0077; H02J 7/0068
USPC .............................................. 307/64, 65, 66
See application file for complete search history.

(56) References Cited

U.S. PATENT DOCUMENTS

| 4,674,021 | A | 6/1987 | Sachs |
| 7,126,409 | B2 | 10/2006 | Nielsen |
| 7,194,645 | B2 | 3/2007 | Bieswanger et al. |
| 7,218,078 | B2 * | 5/2007 | Gagnon ............. G01R 31/3655 320/132 |

(Continued)

FOREIGN PATENT DOCUMENTS

| EP | 512531 A2 | 11/1992 |
| JP | 2005086870 A | 3/2005 |

(Continued)

OTHER PUBLICATIONS

International Search Report and Written Opinion for PCT/IB2016/050915, dated Jul. 13, 2016.

(Continued)

*Primary Examiner* — Richard Tan
(74) *Attorney, Agent, or Firm* — Harness, Dickey & Pierce, P.L.C.

(57) ABSTRACT

A method of controlling an uninterruptible power supply system to increase component life includes decreasing a maximum output power limit of the uninterruptible power supply system when a temperature that the uninterruptible power supply system is experiencing has increased and increasing the maximum output power limit when this temperature has decreased. In an aspect, this temperature is ambient temperature of an equipment enclosure of the uninterruptible power supply system in which at least a rectifier and inverter of the uninterruptible power supply system are located. In an aspect, the method further includes upon the system going into an overload condition, determining an overload time limit based upon the temperature, the overload condition and an initial load condition. In an aspect, the method further includes upon the system going into a back-up power mode, determining a battery autonomy based upon the temperature.

4 Claims, 5 Drawing Sheets

(56) References Cited

U.S. PATENT DOCUMENTS

| | | |
|---|---|---|
| 7,222,246 B2 | 5/2007 | Pomaranski et al. |
| 7,333,314 B2 | 2/2008 | Yamaji et al. |
| 7,908,493 B2 | 3/2011 | Bieswanger et al. |
| 8,179,705 B2 | 5/2012 | Chapuis |
| 8,243,478 B2 | 8/2012 | Matthews |
| 8,462,524 B2 | 6/2013 | Gekeler |
| 8,560,677 B2 | 10/2013 | VanGilder et al. |
| 8,570,010 B2 | 10/2013 | Lin et al. |
| 8,700,923 B2 | 4/2014 | Fung |
| 8,700,930 B2 | 4/2014 | Akiyama |
| 8,799,696 B2 | 8/2014 | Gooding et al. |
| 8,861,164 B2 | 10/2014 | Mikolajczak |
| 2002/0138159 A1 | 9/2002 | Atkinson |
| 2009/0230772 A1 | 9/2009 | Caudill |
| 2010/0211810 A1 | 8/2010 | Zacho |
| 2011/0245988 A1 | 10/2011 | Ingels et al. |
| 2012/0293900 A1 | 11/2012 | Kim et al. |
| 2013/0033203 A1* | 2/2013 | Luke ................ B60L 1/003 318/376 |
| 2013/0100568 A1 | 4/2013 | Mistry et al. |
| 2014/0003655 A1 | 1/2014 | Gopalakrishnan et al. |
| 2014/0233290 A1 | 8/2014 | Spanos et al. |
| 2015/0146327 A1* | 5/2015 | Pfitzer ............... H02H 3/093 361/18 |
| 2015/0333554 A1* | 11/2015 | Cohen ............... H02J 9/062 307/66 |

FOREIGN PATENT DOCUMENTS

| | | |
|---|---|---|
| WO | WO-02097946 A2 | 12/2002 |
| WO | WO2014/105009 * | 7/2014 |

OTHER PUBLICATIONS

Sattar, Abdus, "Insulated Gate Bipolar Transistor (IGBT) Basics," IXYS Corporation, IXAN0063. 1590 Buckeye Dr. Milpitas, CA 95035 USA.

ON Semiconducter "IGBT Applications Handbook", HBD871/D, Rev. 3, Apr. 2014.

* cited by examiner

| Ambient Temp. | Pout | | | |
|---|---|---|---|---|
| °C | Max. Output Power Limit. kVA | Max. Output Power Limit. kW | PF | |
| 55 | 250 | 250 | 1.00 | |
| 50 | 275 | 275 | 1.00 | |
| 45 | 290 | 290 | 1.00 | |
| 40 | 300 | 300 | 1.00 | Nominal Rating |
| 35 | 335 | 320 | 0.96 | |
| 30 | 370 | 335 | 0.91 | |
| 25 | 390 | 350 | 0.90 | |
| 20 | 400 | 360 | 0.90 | |

METHOD OF CONTROLLING AN UNINTERRUPTIBLE POWER SUPPLY SYSTEM TO OPTIMIZE COMPONENT LIFE

FIELD

The present disclosure relates to control of uninterruptible power supplies.

BACKGROUND

This section provides background information related to the present disclosure which is not necessarily prior art.

In a typical datacenter environment, an uninterruptible power supply system (UPS system) provides emergency power to a load when the main power source fails protecting hardware such as computers, servers or other electrical equipment that could cause serious business disruptions or data loss. It provides near-instantaneous protection from power interruptions by supplying energy sufficient enough to start a standby power source or properly shut down the protected equipment.

FIG. 1 is a simplified schematic of a typical prior art UPS system 100. The basic elements of UPS system 100 are rectifier 102, inverter 104, a DC power source such as battery 106, a controller 108, and a static transfer switch 110. Battery 106 may be coupled through a boost circuit 107 to an input 105 of inverter 104, which is also coupled to an output 103 of rectifier 102. An input 114 of rectifier 102 is coupled through disconnect switch 116 to a primary power source 115 of power, typically an AC feed from a utility. An input 118 of static transfer switch 110 is coupled through disconnect switch 120 to a secondary power source 122 of power, typically an AC feed from a utility, and an output 124 of static transfer switch 110 is coupled to an output 126 of inverter 104. Output 126 of inverter 104 is coupled through a disconnect switch 128 to output 112 of UPS system 100. Output 112 of UPS system 100 is coupled through a manual bypass switch 130 to secondary power source 122. It should be understood that primary power source 115 and secondary power source 122 can be different power sources or the same power source, such as the same utility feed coupled to both disconnect switches 116, 120. Static transfer switch 110 is used to switch load 134 connected to an output 112 of UPS system 100 to secondary power source 122. A fuse is used to protect load 134 and is coupled in series between load 134 and the output 112 of UPS system 100. In this regard, when static transfer switch 110 is closed, the load is connected to secondary power source 122 and when static transfer switch is open, the load is disconnected from secondary power source 122 (unless manual bypass switch 130 has been closed).

Controller 108 controls UPS system 100 including controlling inverter 104 by varying the duty cycle of the switching devices in inverter 104 so that inverter 104 provides a desired output voltage. Controller 108 also controls static transfer switch 110 to cause it to switch between closed and open. Controller 108 can be, be part of, or include: an Application Specific Circuit (ASIC); an electronic circuit; a combinational logic circuit; a field programmable gate array (FPGA); and/or a processor such as a Digital Signal Processor (DSP), microcontroller, or the like. It should be understood that controller 108 may include one or more than one of the foregoing, such as digital controller based on DSPs that control each of the functional blocks of UPS system 100 by generating the proper switching signals to switch the power semiconductors such as IGBTs and thyristors.

Rectifier 102 may be a three phase rectifier having three full rectification legs (and illustratively uses power switching devices such as IGBTs), one for each phase, and inverter 104 may be a three phase inverter having three inverter legs, one for each phase. Inverter 104 also illustratively uses power switching devices such as IGBTs. Rectifier 102 and inverter 104 are configured in a double conversion path with UPS system 100 thus being a double conversion UPS system.

Static transfer switch 110 is typically implemented with power semiconductor switching devices. One type of power semiconductor switching device used in implementing static transfer switches is the thyristor since it is a very robust device, is relatively inexpensive, and has low losses. Typically, a static transfer switch implemented with thyristors has a pair of reverse connected thyristors 132 for each phase. That is, if UPS system 100 is a three phase system, static transfer switch 110 would have three pairs of reverse connected thyristors 132, one for each phase. It should be understood that each thyristor 132 may include a plurality of parallel connected thyristors 132 to provide the requisite power handling capability.

SUMMARY

This section provides a general summary of the disclosure, and is not a comprehensive disclosure of its full scope or all of its features.

In accordance with an aspect of the present disclosure, the maximum available output power limit of an uninterruptible power supply system is dynamically set based on at least one temperature experienced by the uninterruptible power supply system. That is, this temperature is used as a control parameter to set the maximum available output power limit. By dynamically set, it is meant that when the temperature being used as the control parameter changes, the maximum available output power limit is changed accordingly. More specifically, as the temperature increases, the maximum available power output limit is lowered. As the temperature decreases, the maximum power output limit is raised.

In accordance with an aspect, a method of controlling an uninterruptible power supply system with a controller of the uninterruptible power supply system includes decreasing a maximum output power limit of the uninterruptible power supply system when at least one temperature experienced by the uninterruptible powers supply system has increased and increasing the maximum output power limit when this temperature has decreased. This temperature is periodically sensed with a temperature sensor and the sensed temperature received by the controller which then adjusts the maximum output power limit.

In an aspect, updating with the controller the maximum power output limit includes setting with the controller the maximum power output limit in a range from higher to lower wherein the higher the temperature the lower the maximum power output limit is. In an aspect, setting the maximum power output in a range from higher to lower includes setting it to a value in a range of values associated with values for the temperature wherein as the temperature increases the associated values for the maximum power output limit decrease.

In an aspect, the temperature is ambient temperature of the area in which the uninterruptible power supply system is located. In an aspect, updating with the controller the maximum power output limit of the uninterruptible power includes setting with the controller the maximum power output limit in a range from higher to lower wherein the higher the ambient temperature is the lower the maximum power output limit is. In an aspect, setting the maximum power output in a range from higher to lower includes setting it to a value in a range of values associated with values for the ambient temperature wherein as the values for the ambient temperature progress from lower to higher the associated values for the maximum power output limit progress from higher to lower.

In an aspect, the method further or alternatively includes upon the uninterruptible power supply system going into an overload condition, determining an overload time limit based on the temperature, the overload condition that the uninterruptible power supply system is in and an initial load condition which is a load condition experienced by the uninterruptible power supply system immediately before the uninterruptible power supply system went into the overload condition, and controlling the uninterruptible power supply system with the controller to shut down an inverter of the uninterruptible power supply system when the determined overload time limit is exceeded.

In an aspect, the method further or alternatively includes upon the uninterruptible power supply system going into a back-up power mode where a battery of the uninterruptible power supply system is used to supply DC power to an inverter of the uninterruptible power supply system, determining a battery autonomy based on the temperature and controlling the uninterruptible power supply system with the controller to shut down the inverter when the determined battery autonomy is exceeded.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In accordance with an aspect of the present disclosure, the maximum available output power limit of an uninterruptible power supply system ("UPS system") is dynamically set based on at least one temperature experienced by the UPS system. That is, this temperature is used as a control parameter to set the maximum available output power limit. By dynamically set, it is meant that when the temperature being used as the control parameter changes, the maximum available output power limit is changed accordingly. More specifically, as this temperature increases, the maximum available power output limit is lowered. As this temperature decreases, the maximum power output limit is raised. Changing the maximum output power limit of the UPS system in this manner optimizes the life of the components of the UPS system.

One factor in determining the life of components in a UPS system, the power semiconductor switching devices, magnetic components and capacitors in particular, is the stress that the components experience as the UPS system is operating. Both the power that the UPS system is outputting and temperature that the UPS system experiences affect this stress. The effect is greatest when the UPS system is operating at its maximum output power limit. For example, an increase in temperature that is experienced by the UPS system results in the components of the UPS system experiencing more stress during operation and a decrease in this temperature results in the components of the UPS system experiencing less stress. As used herein, the temperature experienced by the UPS system means a temperature (or temperatures) experienced by the UPS system as a whole, such as the ambient temperature of an area in which the UPS system is located, such as an equipment enclosure of the UPS system in which at least the rectifier and inverter of the UPS system are located, or a temperature (or temperatures) experienced by individual components of the UPS system.

Figure 1:
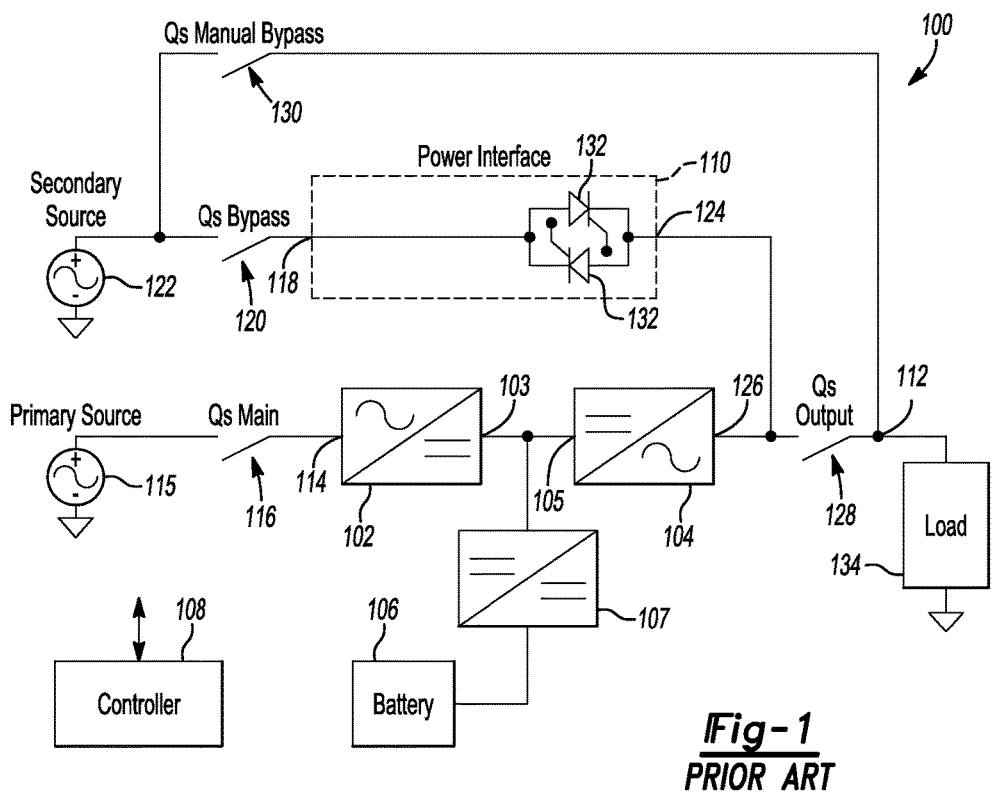
FIG. 1 is a simplified schematic of a prior art UPS system.
Figure 2:
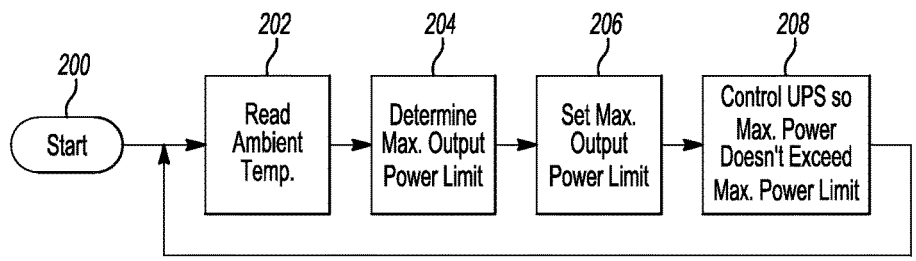
FIG. 2 is a flow chart of a software program for controlling a UPS system in accordance with an aspect of the present disclosure including periodically determining a maximum output power limit based on an ambient temperature the UPS system is experiencing.
Figures 3, 4:
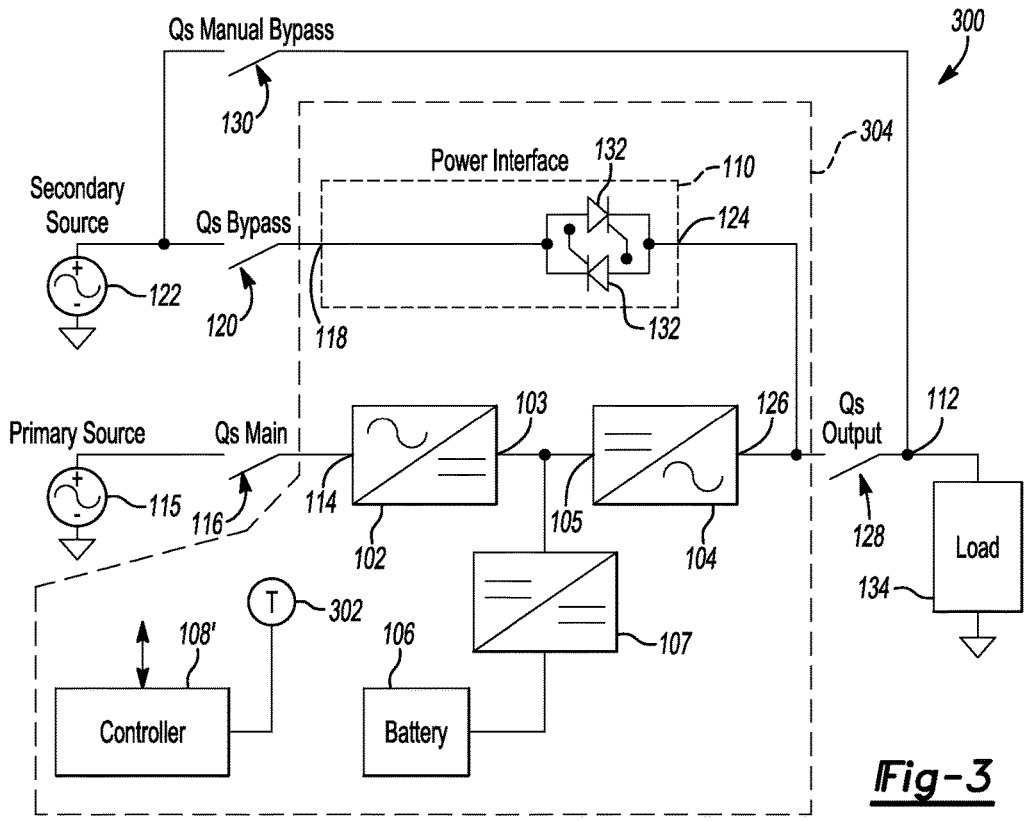
FIG. 3 is a simplified schematic of a UPS system in accordance with an aspect of the present disclosure.
FIG. 4 is a lookup table showing maximum output power limits for various ambient temperatures in accordance with an aspect of the present disclosure.

FIG. 2 is a flow chart of a method of controlling a UPS system 300 (FIG. 3) including periodically determining a maximum output power limit based on an ambient temperature experienced by UPS system 300, such as an ambient temperature of an equipment enclosure 304 of UPS system 300 in which at least rectifier 102 and inverter 104 are located, to optimize the life of the components of the UPS system 300, the power semiconductor switches devices in particular and FIG. 4 is a table showing the maximum power output limits for various ambient temperatures. It should be understood that UPS system 300 has the same basic components as UPS system 100 of FIG. 1 except that controller 108' that controls UPS system 300 includes logic implementing the method of FIG. 2, such as in software programmed in controller 108'. UPS system 300 also includes an ambient temperature sensor 302 coupled to controller 108' that senses ambient temperature that UPS system 300 is experiencing. In the example shown in FIG. 3 where UPS system 300 has an equipment enclosure in which at least rectifier 102 and inverter 104 are located, then temperature sensor 302 is located to sense the ambient temperature in the equipment enclosure, such as at a cooling air inlet of the equipment enclosure.

The method starts at 200. At 202, controller 108' reads the ambient temperature sensed by ambient temperature sensor 302. At 204, controller 108' determines the setting for the maximum output power limit of UPS system 300 by, for example, reading it from the lookup table of FIG. 4. At 206, controller 108' then sets the maximum output power limit of UPS system 300 to the setting that controller 108' determined based on the ambient temperature. It should be understood that if the ambient temperature falls between two entries in the table of FIG. 4, controller 108' determines the maximum output power limit by using the maximum output power limit for the temperature in the table of FIG. 4 that is closest to the ambient temperature. If the ambient temperature is mid-way between temperatures in the table of FIG. 4, the maximum output power limit for the higher of the two temperatures is used. At 208, controller 108' controls UPS system 300 so that the maximum output power of UPS system 300 does not exceed the set maximum output power limit. Controller 108' then branches back to 202 and repeats the above. As such, controller 108' periodically executes the above control logic.

While ambient temperature in the area where UPS system 300 is located was the control parameter in the above discussed example, it should be understood that a temperature other this ambient temperature can be used as the control parameter or as an additional control parameter, such as the temperature(s) of the heatsink(s) on which the power switching semiconductors of the inverter and/or rectifier are disposed or the temperature(s) of other components of the UPS system 300, such as its input and/or output inductors.

In addition to determining the maximum output power limit of the UPS system based on the ambient temperature experienced by the UPS system, other operating parameters of the UPS system can also be determined based on the ambient temperature experienced by the UPS system to optimize component life. Two such operating parameters are an overload time limit and battery autonomy. As used herein, the overload time limit is the maximum time that the inverter of the UPS system is allowed to be in an overload condition before inverter of the UPS system is shut down. This may then result in the UPS system switching over to the bypass power source. As used herein, battery autonomy is the maximum time that the battery is allowed to provide power to the inverter of the UPS system in the event of a power outage.

UPS systems are typically able to manage an inverter overload condition for a short time. Manufacturers of UPS systems have historically specified this time for at least two overload conditions, 125% of nominal output power and 150% of nominal output power. In accordance with an aspect of the present disclosure, the overload time limit for any given overload condition is determined based on an ambient temperature the UPS system, such as UPS system 300, is experiencing, and the load condition of the UPS system immediately before the UPS system goes into an overload condition. The load condition of the UPS system immediately before the UPS system went into the overload condition is referred to herein as the Initial Load Condition. This methodology is described with reference to the two overload conditions of 125% of the maximum output power limit and 150% of the maximum output power limit. It should be understood however that this methodology also applies to overload conditions other than 125% of the maximum output power limit and 150% of the maximum output power limit.

Figure 5:
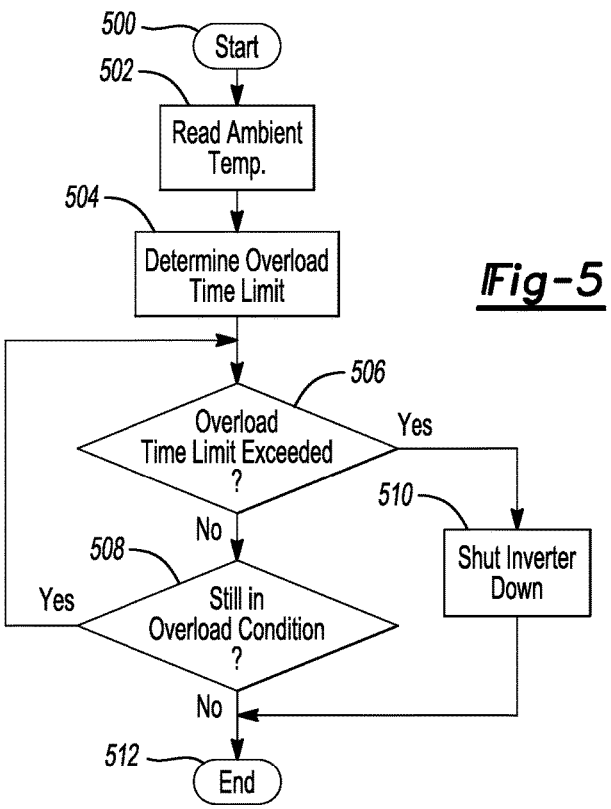
FIG. 5 is a flow chart of a software program for controlling a UPS system in accordance with an aspect of the present disclosure including determining an overload time limit based on an ambient temperature experienced by the UPS system, an overload condition the UPS system is experiencing and an initial load condition.
Figure 6A:
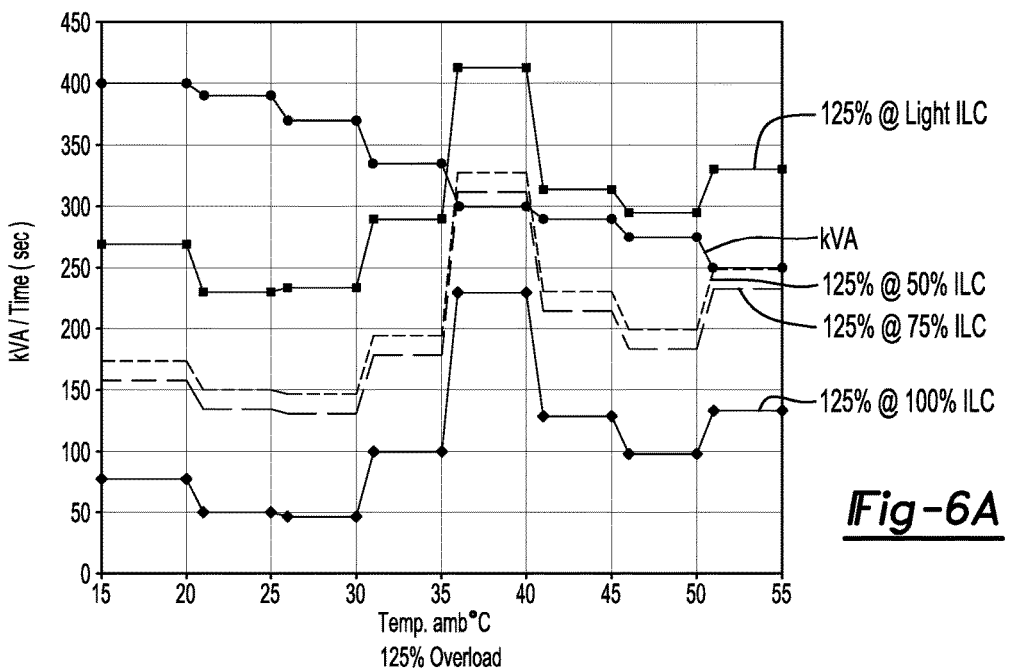
FIGS. 6A and 6B are charts showing overload time limits for various ambient temperatures in accordance with an aspect of the present disclosure.
Figure 6B:
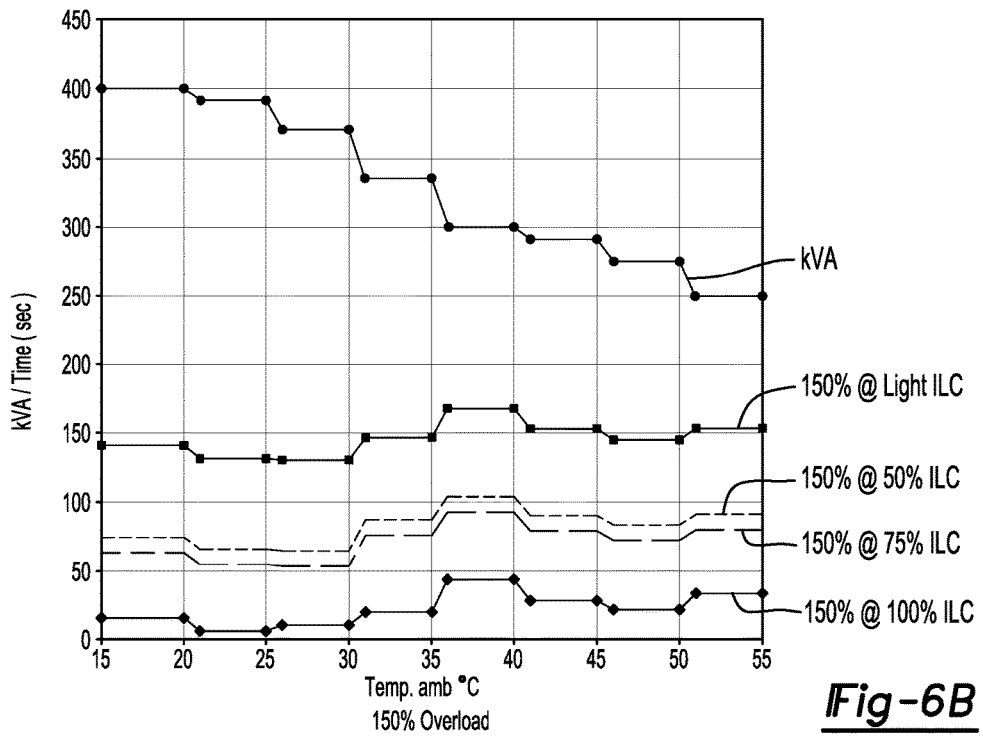

FIG. 5 is a flow chart of a method of controlling UPS system 300 (FIG. 3) to optimize the life of the components of the UPS system 300, the power semiconductor switches devices of inverter 104 in particular that includes determining an overload time limit based on the ambient temperature experienced by UPS system 300 when the UPS system 300 goes into an overload condition, the overload condition the UPS system 300 is experiencing and the Initial Load Condition. As used herein, an overload condition is when the load on inverter 104 is greater than 100% of the maximum output power limit. The overload condition is expressed herein as a percent of the maximum output power limit of UPS system 300 and will be greater than 100%. FIGS. 6A and 6B are charts chart showing the overload time limits for overload conditions of 125% and 150% at various ambient temperatures at various example Initial Load Conditions—a light load Initial Load Condition (such as in the range of 10%-15% of the maximum output power limit at a given ambient temperature), full load Initial Load Condition (100% of the maximum output power limit at a given ambient temperature) and 50% and 75% Initial Load Conditions (which are examples of typical loads in datacenters). In this example, the maximum output power limit for a given ambient temperature is determined as described above with reference to FIGS. 2-4. In FIGS. 6A and 6B, the y axis is kVA for the line designated kVA and otherwise is time in seconds for the remaining lines designated as light ILC, 50% ILC, 75% ILC and 100% ILC (with ILC being Initial Load Condition).

The method starts at 500 upon UPS system 300 going into an overload condition. At 502, controller 108' reads the ambient temperature sensed by ambient temperature sensor 302. At 504, controller 108' determines the overload time limit based on the ambient temperature sensed by ambient temperature sensor 302, the overload condition in which UPS system 300 is in (125% or 150% in the examples given in the charts of FIGS. 6A and 6B) and the Initial Load Condition, by, for example, from the chart of FIGS. 6A and 6B (which may for example be programmed in controller 108,' such as in a lookup table). At 506, controller 108' checks whether the overload time limit has been exceeded. If not, at 508 controller 108' checks whether UPS system 300 is still in the overload condition and UPS system 300 is still in the overload condition, controller 108' branches back to 506. If at 506 the overload time limit has been exceeded, controller 108' branches to 510 where it shuts inverter 104 and then proceeds to 512 where the method ends.

It should be understood that the chart(s) utilized by controller 108' (which may for example have its values included in a lookup table programmed in controller 108') would illustratively include overload time limits for all applicable overload conditions and for all Initial Load Conditions from light load to full load. It should also be understood that these overload time limits are based on the characteristics of the switching power semiconductors, such as IGBT's, used in inverter 104 and for example the overload time limits are a function of the power losses of the switching semiconductors at the various ambient temperatures. The overload time limits may for example be determined by the following formula:

$$TovL = \tau * \ln\left(\frac{\Delta Ths_{amb} - \Delta Ths_{amb_{int}}}{\Delta T_{heat\_amb} - \Delta Tj_{hs} + T_{amb} - T_{jmax}}\right)$$

where: $\tau$ is the thermal time constant of the heatsink where IGBTs are placed; $\Delta Ths_{amb}$ is the ambient temperature rise; $\Delta Ths_{amb_{int}}$ is the external ambient temperature to internal ambient temperature rise (which is used to consider few degrees of difference between the Tamb measured outside the unit and inside the unit (e.g at an air linet of the UPS system); $\Delta T_{heat_{amb}}$ this is the temperature rise of the heatsink where IGBTs are placed; $\Delta Tj_{hs}$ is the temperature rise between the IGBT junction and the heatsink; $T_{amb}$ is the external ambient temperature; and $T_{jmax}$ is the maximum allowed junction operating temperature.

Figure 7:
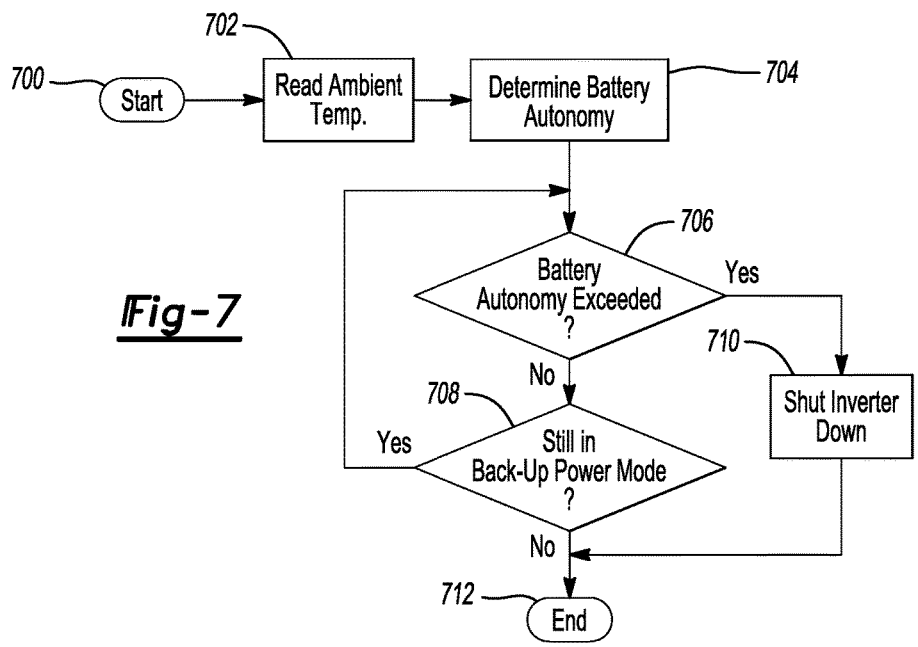
FIG. 7 is a flow chart of a software program for controlling a UPS system in accordance with an aspect of the present disclosure including determining battery autonomy based on an ambient temperature experienced by the UPS system.
Figure 8:
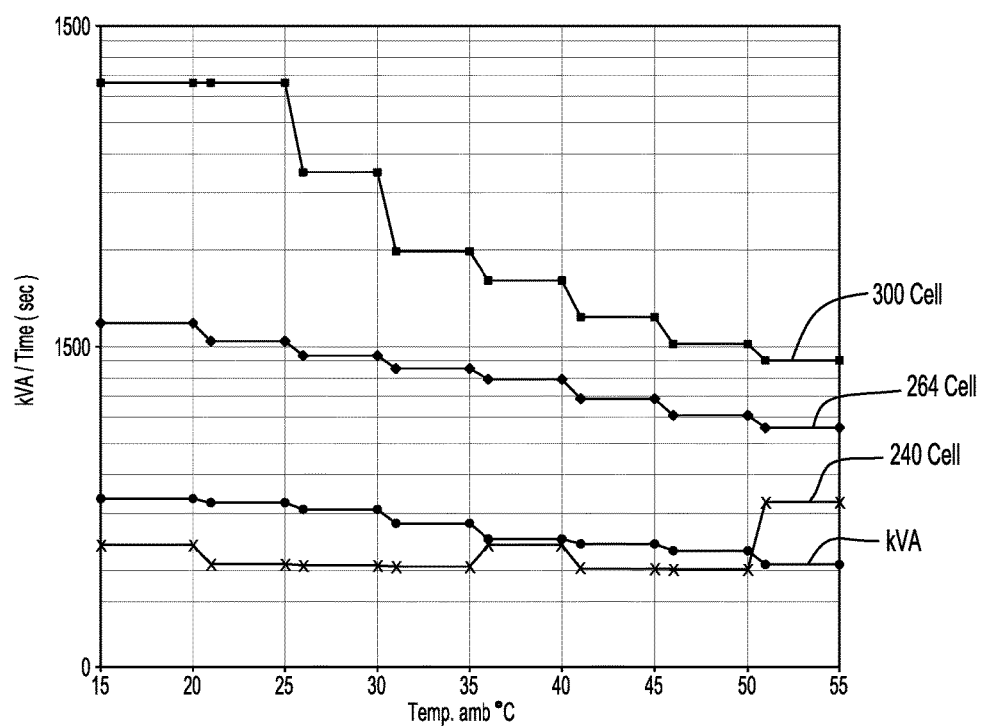
FIG. 8 is a chart showing battery autonomy for various ambient temperatures for examples of batteries having 240 cells. 264 cells and 300 cells.

FIG. 7 is a flow chart of a method of controlling UPS system 300 (FIG. 3) including determining battery autonomy based on an ambient temperature experienced by UPS system 300. FIG. 8 is a chart showing battery autonomy at various ambient temperatures for batteries having 240 cells, 264 cells and 300 cells. In FIG. 8, the y axis is kVA for the line designated kVA and otherwise is time in seconds for the remaining lines designated 240 cells, 264 cells and 300 cells.

The method starts at 700 upon UPS system 300 going into a back-up power mode where the battery 106 is used to supply DC power to inverter 104. At 702, controller 108' reads the ambient temperature sensed by ambient temperature sensor 302. At 704, controller 108' determines the battery autonomy for battery 106 based on the ambient temperature sensed by ambient temperature sensor 302 by, for example, from the chart of FIG. 8 (which may for example have its values programmed in controller 108' such as in a lookup table). At 706, controller 108' checks whether the battery autonomy has been exceeded. If not, at 708 controller 108' checks whether UPS system 300 is still in the back-up power mode and if UPS system 300 is still in the back-up power mode, controller 108' branches back to 706. If at 706 the battery autonomy has been exceeded, controller 108' branches to 710 where it shuts down inverter 104 and then proceeds to 712 where the method ends.

It should be understood that the battery autonomy for battery 106 is the battery autonomy for the number of cells that battery 106 has. It should also be understood that the chart utilized by controller 108' (which may for example have its values included in a lookup table programmed in controller 108') would include the battery autonomy for the number of cells that battery 106 has. The illustration in FIG. 8 for batteries having 240 cells, 264 cells and 300 cells are examples and not limiting as to the number of cells that battery 106 can have.

It should be understood that a UPS system, such as UPS system 300, can have one or any combination of the methods described above with reference to FIGS. 2-8.

It should be understood that controller 108' may be or include a digital processor (DSP) or microprocessor which are programmed with software implementing the above described methods. It should be understood that other logic devices can be used, such as a Field Programmable Gate Array (FPGA), a complex programmable logic device (CPLD), or application specific integrated circuit (ASIC). It should also be understood that when it is stated that controller 108' is configured to perform a function, controller 108' has logic (such as a software program, hardware, or a combination thereof) implementing the performance of the function by controller 108.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling an uninterruptible power supply system with a controller of the uninterruptible power supply system to improve component life, comprising:
    periodically sensing an ambient temperature in an equipment enclosure in which at least a rectifier and an inverter of the uninterruptible power supply system are located with a temperature sensor and receiving with the controller the sensed temperature from the temperature sensor;
    after the controller receives each periodically sensed ambient temperature, updating with the controller a maximum power output limit of the uninterruptible power supply system based on the sensed ambient temperature most recently received by the controller by setting with the controller the maximum power output limit to a value in a range of values wherein the values in the range of values for the maximum power output are associated with values in a range of values for the sensed ambient temperature wherein as the values in the range of values for the sensed ambient temperature increase the associated values in the range of values for the maximum power output limit decrease so that anytime the value of the sensed ambient temperature has increased in the range of values for the sensed ambient temperature the maximum output power limit is decreased to the value associated with the value of the ambient temperature and anytime the value of the sensed ambient temperature has decreased in the range of values for the sensed ambient temperature the maximum power output limit is increased to the value associated with the value of the ambient temperature;
    then controlling the uninterruptible power supply system with the controller so that a maximum power output of the uninterruptible power supply system does not exceed the updated maximum power output limit; and
    upon the uninterruptible power supply system going into an overload condition, determining an overload time limit based on the sensed ambient temperature, the overload condition that the uninterruptible power supply system is in and an initial load condition which is a load condition experienced by the uninterruptible power supply system immediately before the uninterruptible power supply system went into the overload condition, and controlling the uninterruptible power supply system with the controller to shut down an inverter of the uninterruptible power supply system when the determined overload time limit is exceeded.

2. The method of claim 1 further including upon the uninterruptible power supply system going into a back-up power mode where a battery of the uninterruptible power supply system is used to supply DC power to an inverter of the uninterruptible power supply system, determining a battery autonomy based on the sensed ambient temperature and controlling the uninterruptible power supply system with the controller to shut down the inverter when the determined battery autonomy is exceeded, wherein the determined battery autonomy is a maximum time that the battery is allowed to provide power to the uninterruptible power supply system in the event of a power outage.

3. A method of controlling an uninterruptible power supply system with a controller of the uninterruptible power supply system to improve component life, comprising:
upon the uninterruptible power supply system going into an overload condition:
sensing an ambient temperature in an equipment enclosure in which at least the rectifier and inverter of the uninterruptible power supply system are located and receiving with the controller the sensed ambient temperature from the temperature sensor; and
determining with the controller an overload time limit based on the sensed ambient temperature, the overload condition that the uninterruptible power supply system is in and an initial load condition which is a load condition experienced by the uninterruptible power supply system immediately before the uninterruptible power supply system went into the overload condition wherein the determined overload time limit is inversely related to the sensed ambient temperature wherein the higher the sensed ambient temperature the lower the determined overload time limit, and controlling the uninterruptible power supply system with the controller to shut down an inverter of the uninterruptible power supply system when the determined overload time limit is exceeded.

4. A method of controlling an uninterruptible power supply system with a controller of the uninterruptible power supply system to improve component life, comprising:
upon the uninterruptible power supply system going into a back-up power mode where a battery of the uninterruptible power supply system is used to supply DC power to an inverter of the uninterruptible power supply system:
sensing an ambient temperature in an equipment enclosure in which at least the rectifier and inverter of the uninterruptible power supply system are located and receiving with the controller the sensed ambient temperature from the temperature sensor; and
determining with the controller a battery autonomy based on the sensed ambient temperature and controlling the uninterruptible power supply system with the controller to shut down the inverter when the determined battery autonomy is exceeded, wherein the determined battery autonomy is a maximum time that the battery is allowed to provide power to the uninterruptible power supply system in the event of a power outage and the determined battery autonomy is inversely related to the sensed ambient temperature wherein the higher the sensed ambient temperature the lower the determined battery autonomy.

* * * * *